(12) United States Patent
Kuroda

(10) Patent No.: US 6,456,012 B1
(45) Date of Patent: Sep. 24, 2002

(54) PROJECTOR

(75) Inventor: Akitoshi Kuroda, Yamagata-mura (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/648,549

(22) Filed: Aug. 28, 2000

(30) Foreign Application Priority Data

Aug. 30, 1999 (JP) .......................................... 11-243885

(51) Int. Cl.⁷ .............................................. H05B 37/02
(52) U.S. Cl. .......................... 315/158; 340/638; 353/61
(58) Field of Search ........................ 315/158; 340/635, 340/638, 643; 353/52, 61, 72, 98, 100

(56) References Cited

U.S. PATENT DOCUMENTS 6,203,159 B1 * 3/2001 Takizawa ..................... 353/61
6,268,799 B1 * 7/2001 Miyashita et al. .......... 340/641

* cited by examiner

*Primary Examiner*—Don Wong
*Assistant Examiner*—Thuy Vinh Tran
(74) *Attorney, Agent, or Firm*—Oliff & Berridge, PLC

(57) ABSTRACT

A projector is provided which is able to facilitate a reduction in size. The projector includes of a lamp information carrier circuit board and a lamp information detection circuit board, and a fuse for determining use and nonuse of a light source lamp. The lamp information carrier circuit board is stacked so as not to overlap the lamp information detection circuit board. For this reason, the lamp information carrier circuit board and the lamp information detection circuit board are stacked close to each other, and the space between the lamp information carrier circuit board and the lamp information detection circuit board can be narrowed.

3 Claims, 17 Drawing Sheets

PROJECTOR

BACKGROUND OF THE INVENTION

1. Field of Invention

The present invention relates to a projector which includes a light source device having a lamp information carrier circuit board equipped with a lamp information carrier element for determining use and nonuse of a light source, and a lamp information detection circuit board for detecting information from the lamp information carrier circuit board.

2. Description of Related Art

Hitherto, a projector has been known which includes an electro-optical device for forming an optical image from a light beam emitted from a light source according to image information, and a projection lens for enlarging and projecting the image formed by the electro-optical device. Such a projector has been widely used for multimedia presentations at conferences, academic meetings, exhibitions, and the like.

In such a projector, in order to ensure stable brightness and color development state of the projected image, a light source device has been conventionally utilized in which a light source lamp, such as a metal halide lamp or a xenon lamp, is fixed to a reflector and is housed in a lamp housing. The lamp housing is provided with, at the outer periphery thereof, a lamp information carrier circuit board equipped with a fuse serving as a lamp information carrier element for determining use and nonuse of a light source.

On the other hand, the projector body includes a lamp information detection circuit board for detecting information from the lamp information carrier circuit board, and is configured so as to total up the lamp lighting time of the light source device, and to forcibly shut down the light source lamp when the light source lamp reaches its application limit, or to display on a projection screen to that effect. More specifically, when a new light source device is mounted in the projector body, (1) the lamp information detection circuit board and the lamp information carrier circuit board are connected, (2) the lamp information detection circuit board confirms the presence of an electrical continuity of a fuse provided on the lamp information carrier circuit board, (3) a total lamp operating time recorded in the device body is reset, and (4) the fuse of the lamp information carrier circuit board is cut off and totaling up of operating time of the light source device is started.

Such a lamp information carrier circuit board and a lamp information detection circuit board are stacked inside the device so that the lamp information detection circuit board covers the fuse.

SUMMARY OF THE INVENTION

While projectors are sometimes kept installed in a conference room or the like for a presentation, they are sometimes brought in as necessary, or are stored in elsewhere after use. Accordingly, it is necessary to improve portability in order to facilitate transportation, and a further reduction in size is demanded.

However, if the lamp information carrier circuit board and the lamp information detection circuit board are disposed so that the lamp information detection circuit board covers the fuse, a space is required inside the device having the height greater than the total thickness represented by the sum of the thickness of the lamp information carrier circuit board, the projecting size of the fuse provided on the lamp information carrier circuit board, and the thickness of the lamp information detection circuit board. Therefore, it is difficult to achieve a reduction in size of the projector.

One object of the present invention is to provide a projector which at least is able to facilitate a reduction in size.

A projector of one exemplary embodiment the present invention includes a light source device having a lamp information carrier circuit board equipped with a lamp information carrier element for determining use and nonuse of a light source, and a lamp information detection circuit board for detecting information from the lamp information carrier circuit board. The lamp information carrier circuit board and the lamp information detection circuit board are preferably stacked so that the lamp information detection circuit board does not overlap the lamp information carrier element of the lamp information carrier circuit board.

According to this exemplary embodiment the present invention, since the lamp information carrier element is not provided between the lamp information carrier circuit board and the lamp information detection circuit board, it is possible to dispose the lamp information carrier circuit board and the lamp information detection circuit board close to each other. This may reduce the total thickness of the boards as compared to a conventional device, even if they are stacked. Therefore, it is possible to achieve a reduction in size of the projector.

In the foregoing, the lamp information carrier circuit board and the lamp information detection circuit board may preferably be electrically connected via an urging device.

Since the urging device is formed so as to be brought into contact with the lamp information detection circuit by an urging force, this makes it possible to automatically establish electrical continuity by only accommodating the light source device in the projector.

In addition, the urging device may preferably include a fixed part, fixed to one of the lamp information carrier circuit board and the lamp information detection circuit board, and a contacting part having a contacting surface urged toward one of the lamp information carrier circuit board and the lamp information detection circuit board which is not provided with the fixed part and contacting one of the lamp information carrier circuit board and the lamp information detection circuit board which is not provided with the fixed part. The contacting part may preferably be composed of a plate spring.

If the contacting part is composed of a plate spring in this way, it is possible to simplify the structure, as compared to a case in which the contacting part is composed of a coiled spring or the like, whereby manufacture of the urging device is facilitated. In addition, when accommodating the light source device in the projector, the contacting surface of the contacting part may be moved by an urging force along the surface of the lamp information detection circuit board or the lamp information carrier circuit board while contacting. Therefore, it is possible to remove dust and the like adhered to the contacted surface of the lamp information detection circuit board or the lamp information carrier circuit board. This makes it possible to prevent contact failure between the urging device and the lamp information detection circuit board or the lamp information carrier circuit board beforehand.

In addition, the urging device may preferably be provided on the lamp information carrier circuit board.

This may allow the urging device to be replaced each time the light source device is replaced as compared to a case in which the urging device is provided on the side of the projector. Therefore, even if the projector is used for many years, the urging force of the urging device is not decreased, and it is possible to easily maintain electrical connection between the boards.

Furthermore, the contacting part may preferably be gold-plated.

This may prevent the contacting part from being oxidized to rust, and it is possible to positively secure electrical continuity even if it is used for a long period of time.

DETAILED DESCRIPTION OF PREFERRED EMBODIMENTS

An exemplary embodiment of the present invention will now be described with reference to the drawings.

(1) Overall Configuration of the Device

Figure 1:
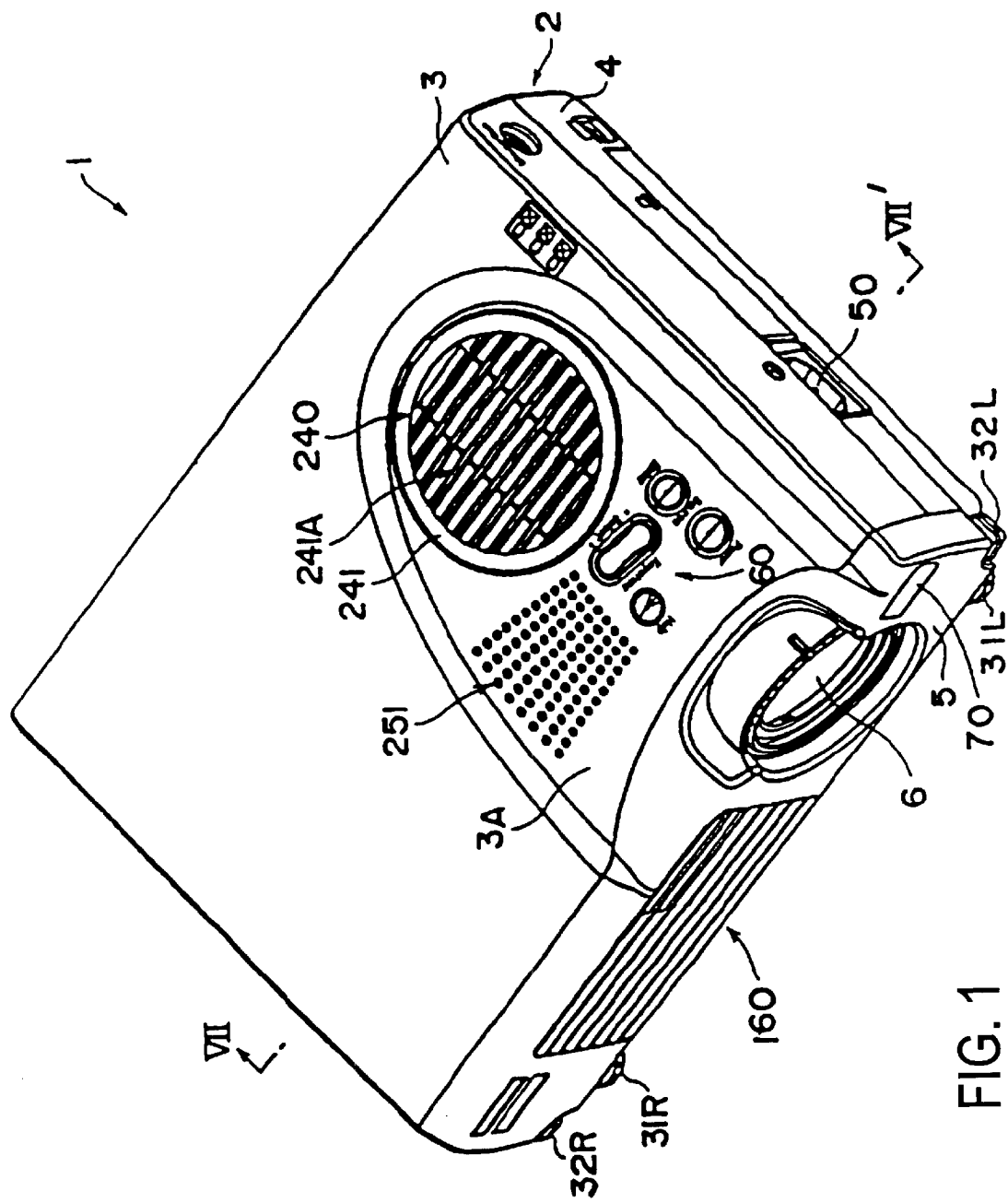
FIG. 1 is an outward perspective view from a top face-side of a projector according to an exemplary embodiment of the present invention.
Figure 2:
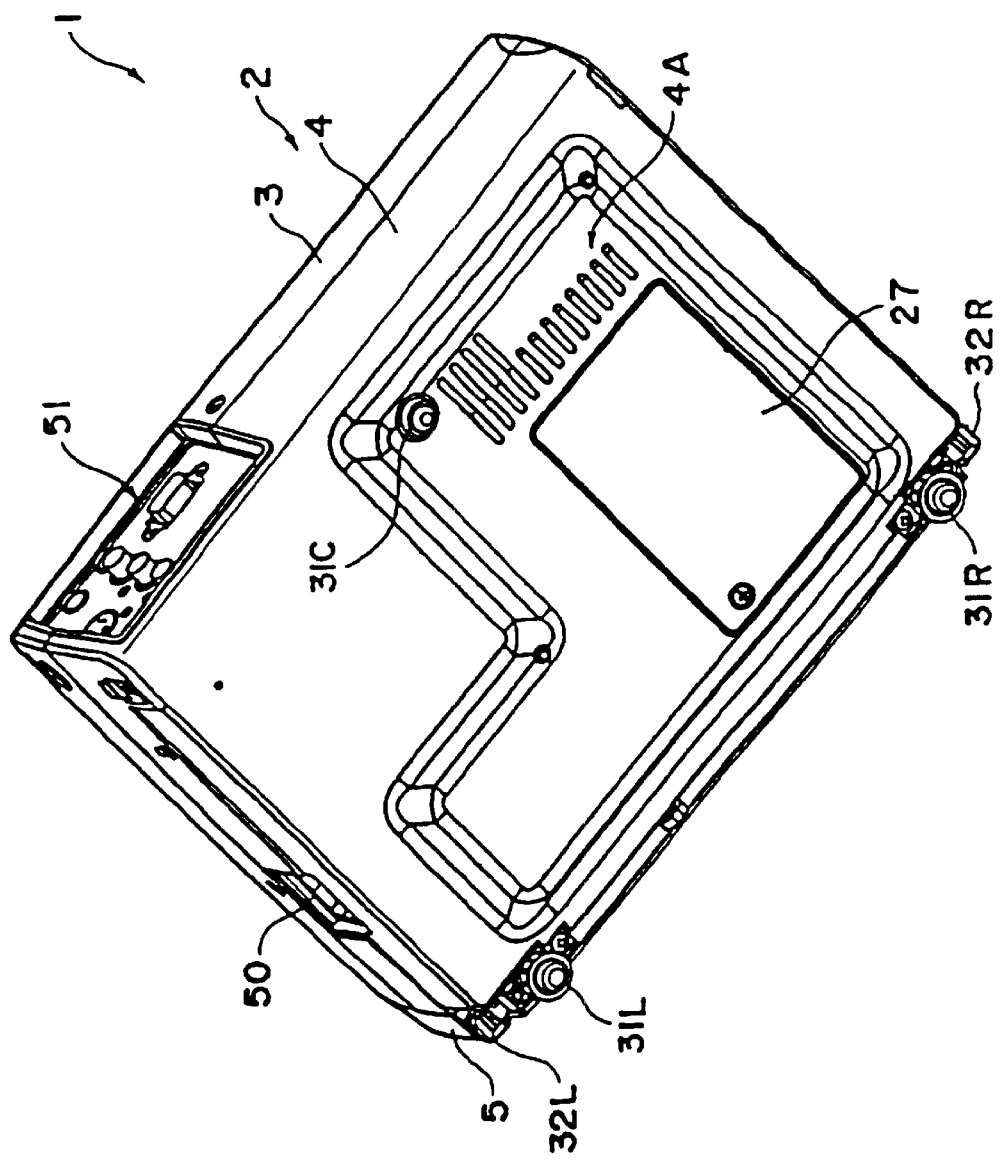
FIG. 2 is an outward perspective view from the bottom surface of the projector of FIG. 1.

FIGS. 1 and 2 are schematic perspective views of a projector 1 according to this exemplary embodiment. FIG. 1 is a perspective view as viewed from the top surface, and FIG. 2 is a perspective view as viewed from the bottom surface.

The projector 1 is of a type that separates a light beam emitted from a light source device serving as a light source into the three primary colors of red (R), green (G), and blue (B). The projector then modulates these color light beams according to image information through liquid crystal panels constituting an electro-optical device, synthesizes the modulated light beams of the respective colors using a cross-dichroic prism (color-synthesizing optical system), and enlarges and displays the synthesized light beam onto a projection plane via a projection lens 6. While components are accommodated in an outer casing 2, the projection lens 6 is provided to be extendible from the outer casing 2, according to need, by a zooming mechanism thereof.

(2) Structure of Outer Casing

The outer casing 2 basically consists of an upper casing 3 for covering the top of the device, a lower casing 4 constituting the bottom surface of the device, and a front casing 5 for covering the front of the device. The upper casing 3 and the lower casing 4 may be made by magnesium die-casting, and the front casing 5 may be made of resin.

On the right side of the top surface (right side as viewed from the front) of the upper casing 3, there is provided an air inlet 240 covered with a filter replacement cover 241 made of resin. The filter replacement cover 241 is formed with a slit-like opening 241A for introducing air taken in from the outside into the device as cooling air, and an internal air filter 242 (FIG. 8) is provided inside the filter replacement cover 241. The filter replacement cover 241 is attached to and detached from the top surface of the upper casing 3, whereby the internal air filter 242 can be replaced.

Figure 7:
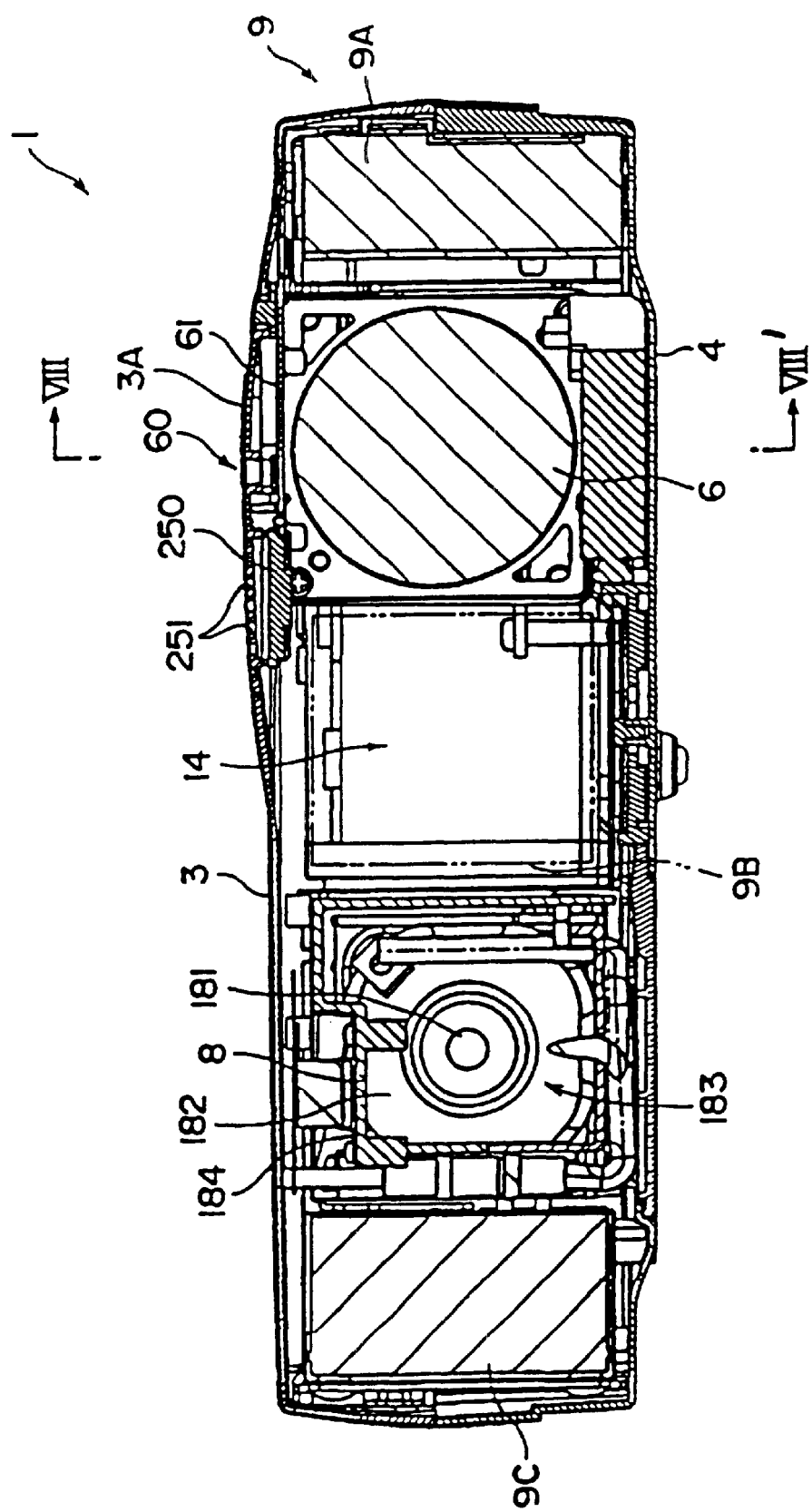
FIG. 7 is a vertical sectional view of the projector taken along the line VII–VII' in FIG. 1.
Figure 8:
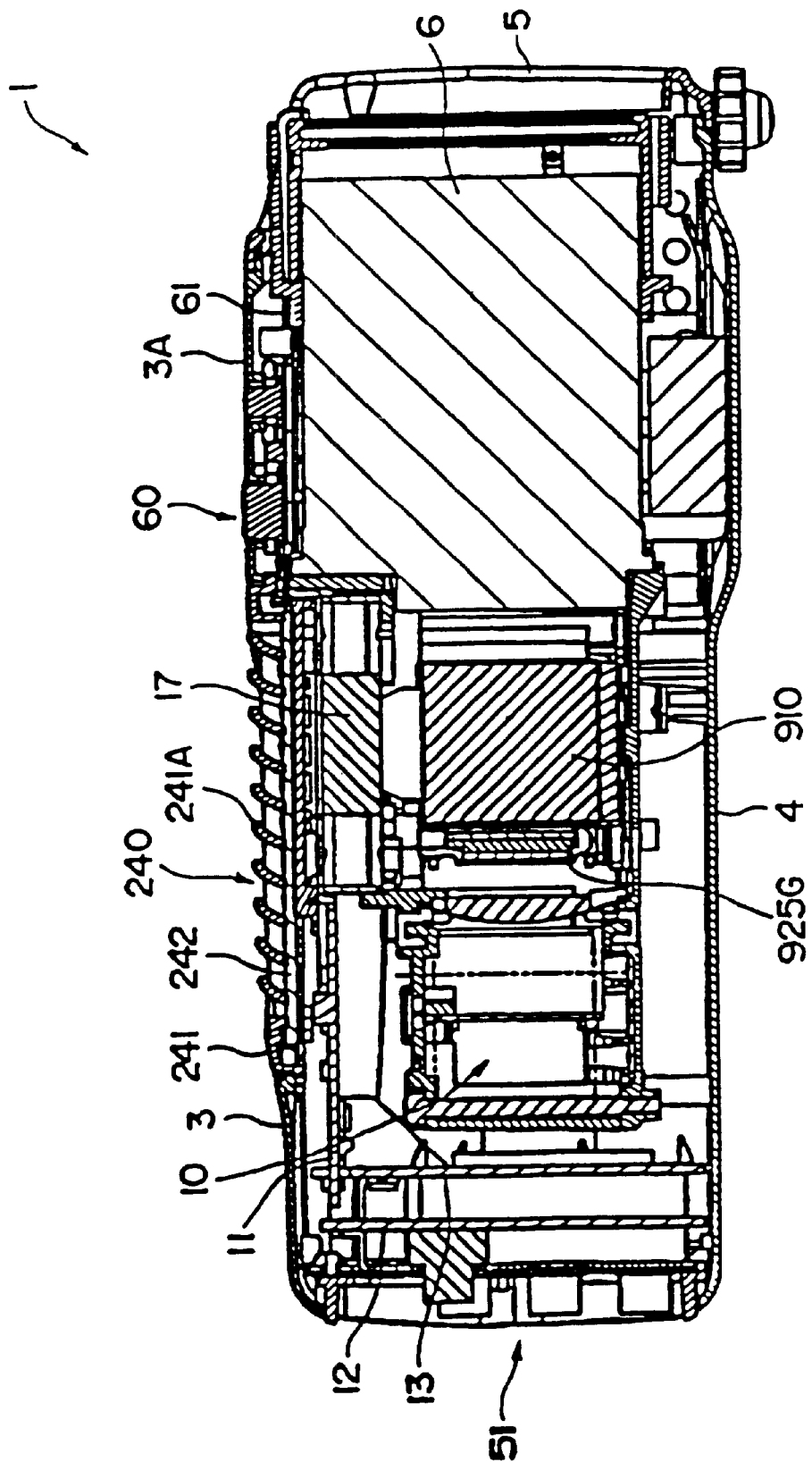
FIG. 8 is another vertical sectional view of the projector taken along the line VIII–VIII' in FIG. 7.

In addition, many communication holes 251 for a speaker 250 (FIG. 7) are formed in front of the filter replacement cover 241 on the top surface of the upper casing 3. A control panel 60 for adjusting image quality of the projector 1 is provided next to the communication holes 251. At a section on which the filter replacement cover 241, the communication holes 251, and the control panel 60 are formed, a part of the upper casing 3 bulges upward to form a bulged portion 3A, as shown in FIGS. 7 and 8, and the aforementioned internal air filter 242 and speaker 250, and a circuit board 61 for the control panel 60 are accommodated in an internal space formed by the bulged portion 3A.

In FIG. 2, the bottom surface of the lower casing 4 is provided with a lamp replacement cover 27 for replacing a light source lamp unit 8 (FIGS. 3 and 4) accommodated inside the device. The bottom surface of the lower casing 4 is provided with feet 31R and 31L at front corners thereof, and a foot 31C in the rear center thereof The feet 31R and 31L are extended and retracted in a projecting direction by rotating a dial portion or by operating levers 32R and 32L, and the height and the inclination of the display screen can be varied by controlling the amount of extension or retraction thereof.

A light-receiving section 70 for receiving optical signals from a remote controller (not shown) is provided at the front right portion of the front casing 5. An air outlet 160 for exhausting air inside the device is provided in substantially the center of the front casing 5.

On the side surface and the rear surface of such an outer casing 2 near the air inlet 240, there are provided an AC inlet 50 for connecting the device to an external power source, and various types of input-output terminals 51.

(3) Internal Structure of the Device

Figure 3:
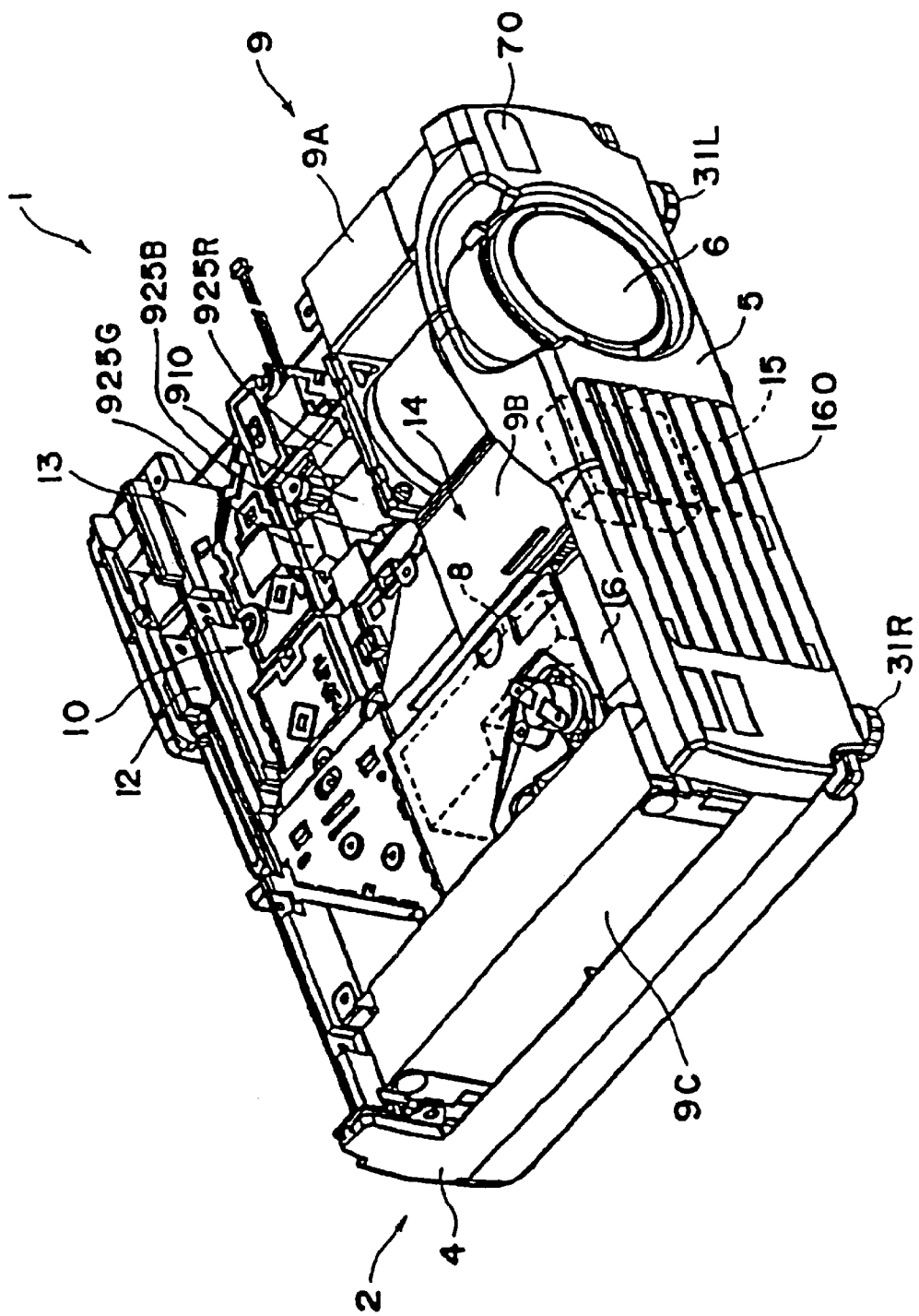
FIG. 3 is a perspective view showing the internal structure of the projector of FIG. 1.
Figure 4:
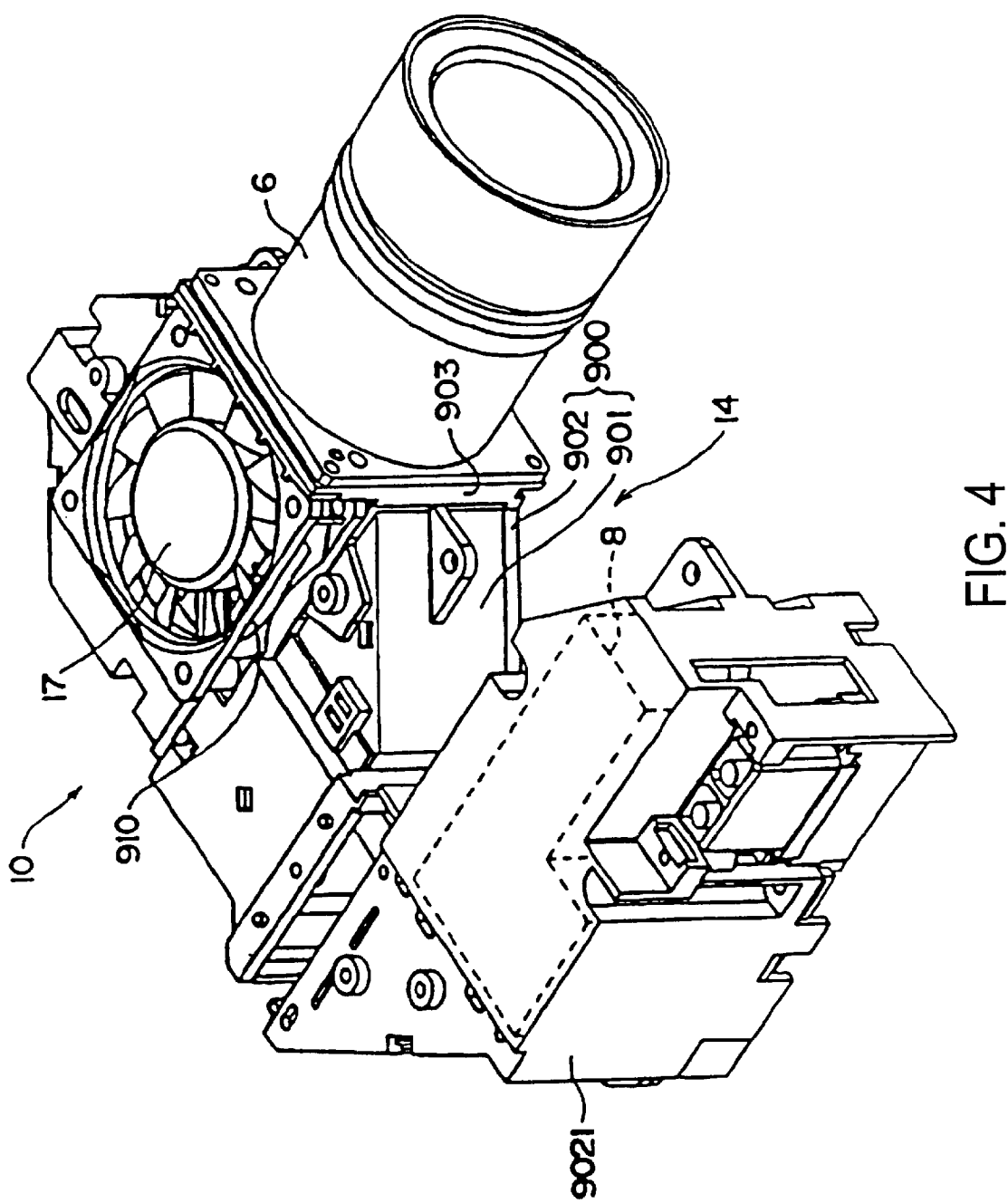
FIG. 4 is a perspective view showing an optical system of the projector of FIG. 1.
Figure 5:
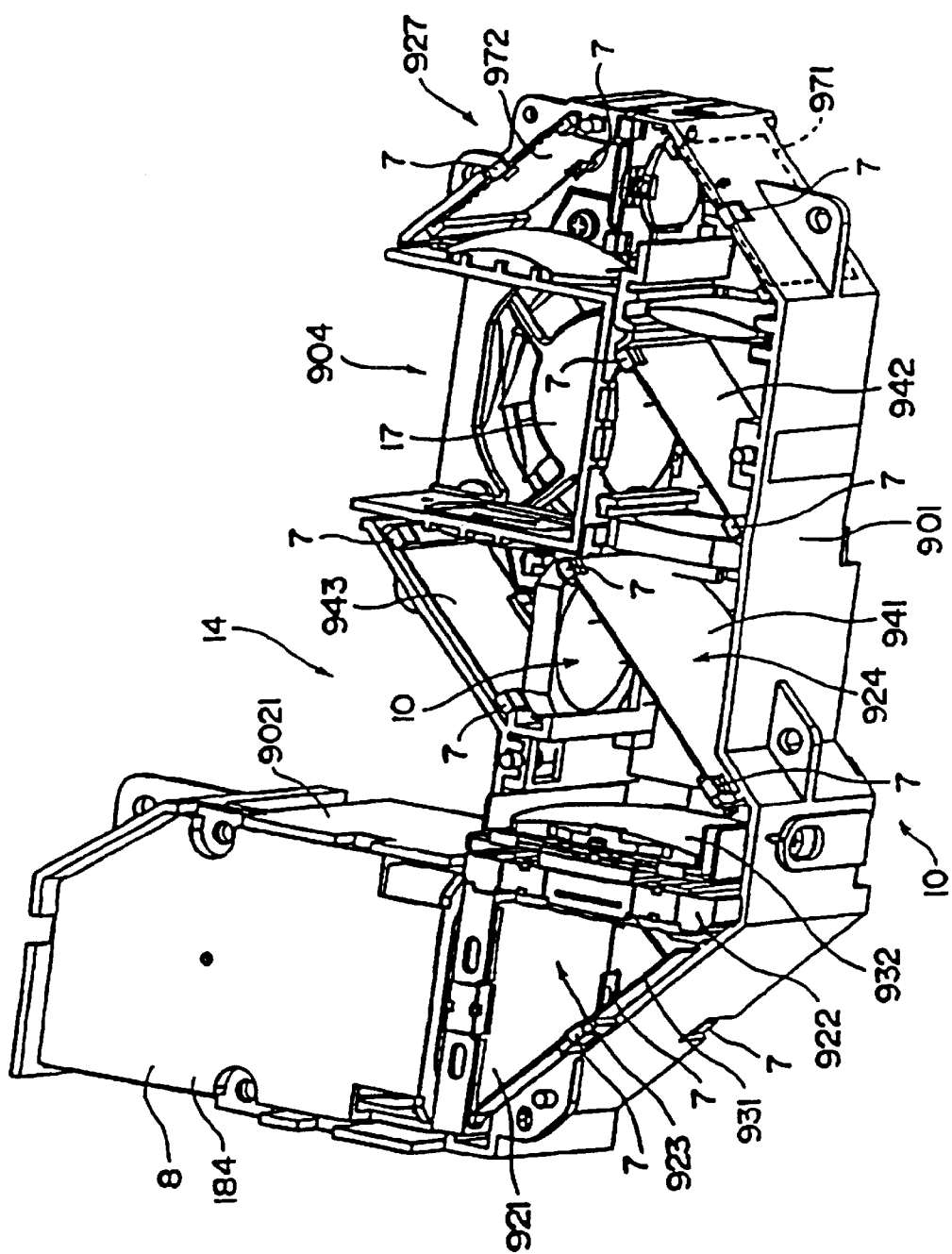
FIG. 5 is a perspective view showing the structure of the optical system of FIG. 4.
Figure 6:
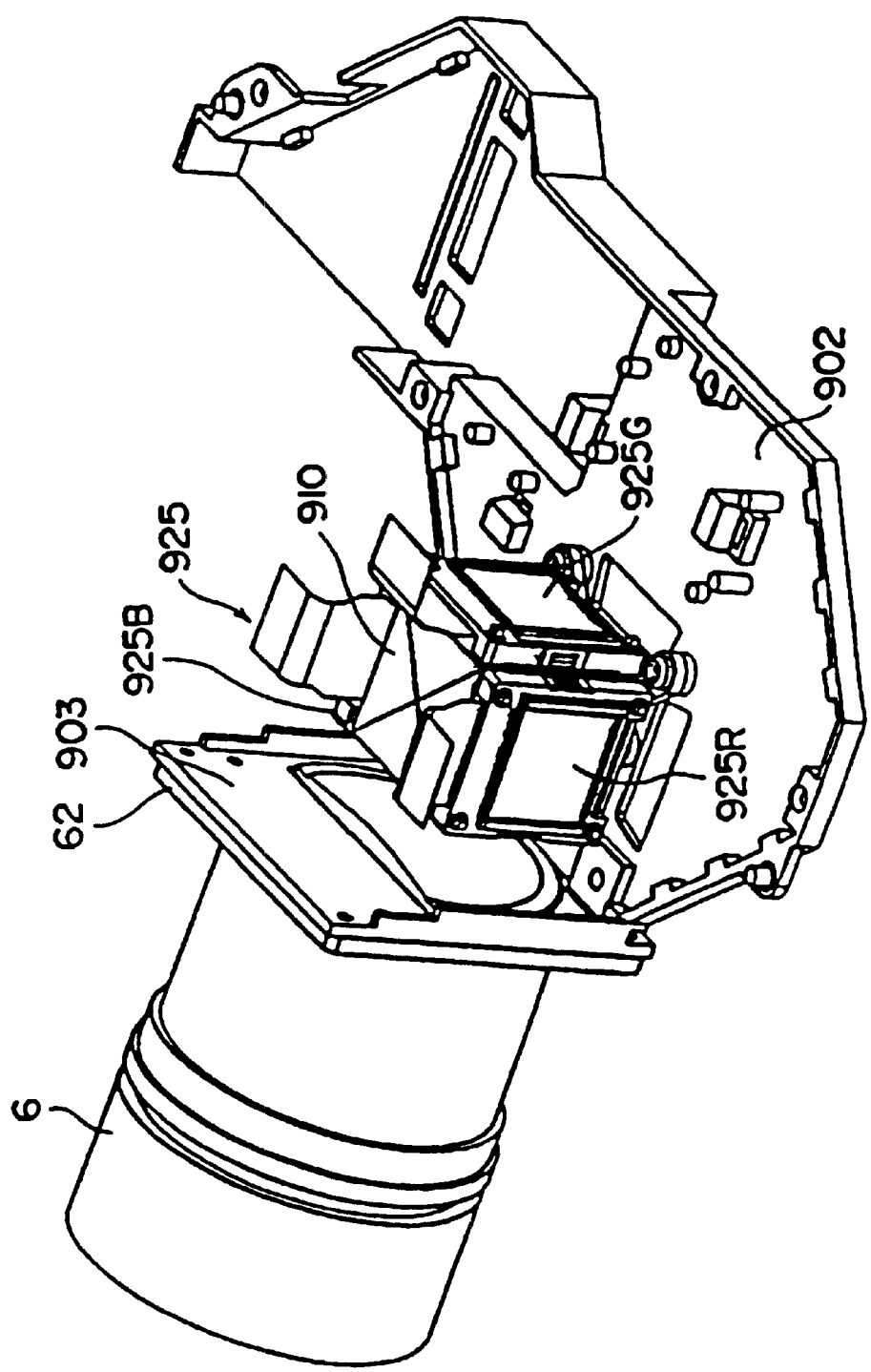
FIG. 6 is another perspective view showing the structure of the optical system of FIG. 4.

FIGS. 3 to 8 show the internal structure of the projector 1. FIG. 3 is a schematic perspective view of the inside of the device, FIG. 4 is a perspective view showing an optical system, FIGS. 5 and 6 are perspective views each showing the inside of the optical system, and FIGS. 7 and 8 are vertical sectional views of the projector 1.

In these figures, a light source lamp unit 8, a power source unit 9 serving as a power source, an optical unit 10, a driver board 11 (FIG. 8), a main board 12, an AV board 13, and the like, are disposed inside the outer casing 2. In this exemplary embodiment, as shown also in FIG. 9, the light source lamp unit 8, the optical unit 10, and the aforementioned projection lens 6 constitute a U-shaped optical system in plan view according to the present invention, and the boards 11, 12, and 13 constitute a control system according to the present invention.

The power source unit 9 is composed of a first power source block 9A disposed next to the side of the projection lens 6 of the optical system, a second power source block 9B disposed in a center opening 14 in the U-shaped optical system in plan view, that is, between the projection lens 6 and the light source lamp unit 8, and a third power source block 9C disposed next to the side of the light source lamp unit 8 of the optical system.

The first power source block 9A includes the AC inlet 50, and distributes and supplies electric power from the external power source obtained via the AC inlet 50 to the second power source block 9B and the third power source block 9C.

The second power source block 9B transforms the electric power obtained from the first power source block 9A and mainly supplies it to the main board 12 constituting the control system. An auxiliary exhaust fan 15 actuated by the electric power from the second power source block 9B is mounted on the side of the air outlet 160 of the second power source block 9B.

The third power source block 9C transforms the electric power obtained from the first power source block 9A and supplies it to a light source device 183 (FIG. 9) serving as a power source in the light source lamp unit 8. That is, since the third power source block 9C should supply electric power to the light source device 183 that consumes the most electric power, the third power source block 9C is larger than the first and second power source blocks 9A and 9B, and is provided having a size extending across the front and back of the device 1.

Such first to third power source blocks 9A to 9C are fixed to the lower casing 4 by screws and the like prior to the fixing of the projection lens 6 or the optical unit 10. The first power source block 9A may supply electric power only to the second power source block 9B, and the third power source block 9C may receive electric power from the second power source block 9B.

Figure 9:
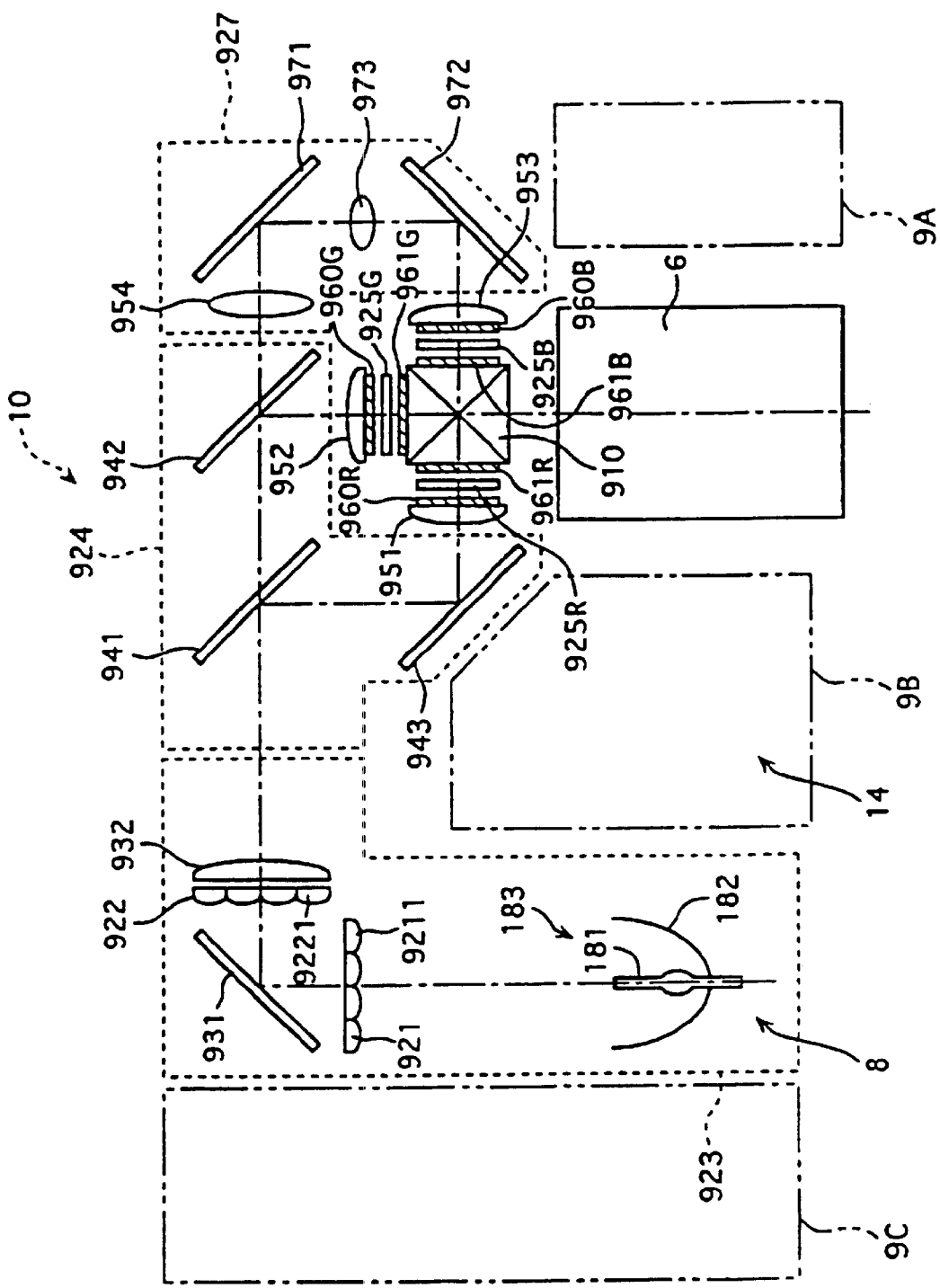
FIG. 9 is a schematic diagram for the explanation of the function of the optical system of FIG. 4.

As shown in FIG. 9, the light source lamp unit 8 constitutes a light source section of the projector 1, and has the light source device 183 consisting of the light source lamp 181 and a concave mirror 182, and a lamp housing 184 for housing therein the light source device 183. The lamp housing 184 is provided with a lamp information carrier circuit board 220 (see FIG. 12) for determining use and nonuse of the light source lamp 181.

As shown in FIG. 4, in the lamp housing 184, the light source lamp unit 8 is covered with an accommodating section 9021 that is integrally formed with an upper light guide 901 constituting a light guide 900, to be described later, so as to be removable from the above-described lamp replacement cover 27. As shown in FIG. 3, a main exhaust fan 16 larger than the auxiliary exhaust fan 15 is disposed in front of the accommodating section 9021 at a position corresponding to the air outlet 160. The main exhaust fan 16 is also actuated by electric power from the second power source block 9B.

The optical unit 10 is a unit for optically processing a light beam emitted from the light source lamp unit 8 to form an optical image corresponding to image information, and includes the light guide 900. As shown in FIG. 4, the light guide 900 is composed of the box-like upper light guide 901 made of resin, and a lid-like lower light guide 902 made of magnesium. The light guide 900 accommodates therein an illumination optical system 923, a color light separation optical system 924, an electro-optical device 925 serving as a modification system, and a cross-dichroic prism 910 serving as a color-synthesizing optical system (FIG. 9). In addition, the lower light guide 902 is provided with a vertical head plate 903 to which the projection lens 6 is fixed. The optical elements in the optical unit 10 other than the electro-optical device 925 and the cross-dichroic prism 910 are sandwiched and held between the upper and lower light guides 901 and 902. The upper light guide 901 and the lower light guide 902 are combined in one piece and fixed to the side of the lower casing 4.

The cross-dichroic prism 910 is fixed on the lower light guide 902 at the back of the head plate 903. Liquid crystal panels 925R, 925G, and 925B constituting the electro-optical device 925 are disposed to oppose three side faces of the cross-dichroic prism 910, and are bonded and fixed to the opposing faces of the cross-dichroic prism 910 via a fixing member. The positional relationships among the liquid crystal panels 925R, 925G, and 925B are such that the liquid crystal panel 925B is positioned to oppose the liquid crystal panel 925R across the cross-dichroic prism 910, and the liquid crystal panel 925G is positioned to oppose the projection lens 6 across the cross-dichroic prism 910. These liquid crystal panels 925R, 925G, and 925B are cooled by cooling air from an intake fan 17 (FIG. 4) that is positioned above the cross-dichroic prism 910, and is provided corresponding to the aforementioned air inlet 240. In this case, electric power for actuating the inlet fan 17 is supplied from the main board 12 via a driver board 11 (FIG. 8).

The driver board 11 controls the liquid crystal panels 925R, 925G, and 925B of the above-described electro-optical device 925, and is disposed above the optical unit 10.

The main board 12 is formed with a control circuit for controlling the entire projector 1, and stands behind the optical unit 10. Accordingly, the main board 12 and the driver board 11 are disposed perpendicular to each other, and are electrically connected via a connector. A lamp information detection circuit board 230 (FIG. 12) for detecting information from the lamp information carrier circuit board 220 is connected to the main board 12 via a connector.

The AV board 13 is a circuit board equipped with the aforementioned input-output terminals 51, stands between the optical unit 10 and the main board 12, and is electrically connected to the main board 12.

In the foregoing internal structure, after cooling the electro-optical device 925, cooling air drawn by the intake fan 17 is guided by the rotation of the exhaust fans 15 and 16 toward the light source lamp unit 8 while cooling the boards 11, 12, and 13. Then, the cooling air flows mainly into the light source lamp unit 8 together with fresh cooling air from intake slits 4A (FIG. 2) formed in the bottom face of the lower casing 4 to cool the inside light source device 183. In addition, a part of the cooling air flows toward the second power source block 9B, and the other part flows toward the third power source block 9C to cool the power source blocks, respectively. Thereafter, the cooling air is exhausted toward the entire front face of the device 1 from the air outlet 160 by the exhaust fans 15 and 16.

(4) Structure of Optical System

Next, the optical unit 10 of the optical system will be described in detail with reference to FIGS. 5 and 9.

The optical unit 10 is composed of the illumination optical system 923, the color light separation optical system 924, and a relay optical system 927 each accommodated in the upper light guide 901, the electro-optical device 925 and the cross-dichroic prism 910 serving as a color light-synthesizing optical system each fixed to the lower light guide 902, and the projection lens 6 fixed to the head plate 903 of the lower light guide 902.

The illumination optical system 923 is an integrator illumination optical system for illuminating nearly uniformly image formation areas of the three liquid crystal panels 925R, 925G, and 925B of the electro-optical device 925, and includes the light source device 183, a first lens array 921, a second lens array 922, a reflecting mirror 931, and a superimposing lens 932. These lens arrays 921 and 922, superimposing lens 932, and reflecting mirror 931 are disposed so as to be supported at a raised portion of the upper light guide 901, and are fixed by clips 7 serving as fallout-preventing members so that they do not fall out even if the upper light guide 901 is reversed from the state shown in FIG. 5.

The light source device 183 constituting the illumination optical system 923 includes the light source lamp 181 serving as a light source for emitting radiating light beams, and the concave mirror 182 for emitting radiating light emitted from the light source lamp 181 as nearly parallel light beams. As the light source lamp 181, a halogen lamp, a metal halide lamp, or a high pressure mercury lamp is often used. As the concave mirror 182, a parabolic mirror or an ellipsoidal mirror may preferably be used.

The first lens array 921 has a configuration such that small lenses 9211 each having a substantially rectangular outline are aligned in an M by N matrix. Each small lens 9211 divides a parallel light beam incident from the light source into a plurality of (e.g. M×N) partial light beams, and forms the partial light beams into an image near the second lens array 922. The outline shape of each small lens 9211 is set to be similar to the shape of the image formation areas of the liquid crystal panels 925R, 925G, and 925B. For example, if the aspect ratio (the ratio of the horizontal size to the vertical size) of the image formation area of the liquid crystal panel is 4:3, the aspect ratio of each small lens is set to be 4:3.

The second lens array 922 also has a configuration such that small lenses 9221 are aligned in an M by N matrix so as to correspond to the small lenses 9211 of the first lens array 921. The second lens array 922 has the function of arranging center axes (main light beams) of partial light beams emitted from the first lens array 921 so as to be incident perpendicularly on the incident surface of the superimposing lens 932. The superimposing lens 932 has the function of superimposing a plurality of partial light beams on the three liquid crystal panels 925R, 925G, and 925B. In addition, as shown in FIG. 5, the second lens array 922 is disposed at an angle of 90 degrees with respect to the first lens array 921 across the reflecting mirror 931.

The reflecting mirror 931 is a mirror for guiding a light beam emitted from the first lens array 921 to the second lens array 922, and is not always required according to the configuration of the illumination optical system. For example, the reflecting mirror 931 is not required when the first lens array 921 and the light source is provided parallel to the second lens array 922.

The color light separation optical system 924 includes two dichroic mirrors 941 and 942, and a reflecting mirror 943 serving as optical components according to the present invention, and has the function of separating light emitted from the superimposing lens 932 of the illumination optical system 923 into light of the three colors of red, green, and blue. The mirrors 941, 942, and 943 are supported at the raised portion of the upper light guide 901 in a manner similar to that described above, and are fixed to the upper light guide 901 by the clips 7.

The relay optical system 927 includes an incident-side lens 954, a relay lens 973, and reflecting mirrors 971 and 972, and these reflecting mirrors 971 and 972 are also fixed to the upper light guide 901 by the clips 7.

The liquid crystal panels 925R, 925G, and 925B of the electro-optical device 925 use, for example, a polysilicon TFT as a switching element. The liquid crystal panels 925R, 925G, and 925B are disposed outside the upper light guide 901 to correspond to a concave portion 904 (FIG. 5) provided at the outer periphery of the upper light guide 901, and are bonded and fixed to opposing faces of the cross-dichroic prism 910 via a fixing member so as to oppose three side faces of the cross-dichroic prism 910. Incident-side polarizers 960R, 960G, and 960B are disposed on the side of the light incident surfaces of the liquid crystal panels 925R, 925G, and 925B, and emitting-side polarizers 961R, 961G, and 961B are disposed on the side of the light emitting surfaces, respectively.

The cross-dichroic prism 910 has the function of forming a color image by synthesizing light of the three colors, and is fixed to the top face of the lower light guide 902 by fixing screws and the like. The cross-dichroic prism 910 is formed with a dielectric multilayer film for reflecting red light, and a dielectric multilayer film for reflecting blue light formed in substantially the shape of an X, and the three color lights are synthesized by these dielectric multilayer films.

The projection lens 6 is the heaviest optical component in the projector 1, and is fixed to the head plate 903 of the lower light guide 902 via a flange 62 (FIG. 6) provided at the base end thereof.

The thus-configured optical unit 10 is assembled as follows.

First, the box-like upper light guide 901 is placed so that its opening side faces upward, and optical components (reflecting mirrors, various lenses, etc.) constituting the illumination optical system 923, the color light separation optical system 924, and the relay optical system 927 are disposed in the upper light guide 901, and the optical components are fixed to the upper light guide 901 by the clips 7.

On the other hand, the cross-dichroic prism 910 having the liquid crystal panels 925R, 925G, and 925B fixed to the top face thereof is fixed to the lid-like lower light guide 902, and the projection lens 6 is fixed to the head plate 903. Then, the upper light guide 901 having optical components mounted thereon is reversed, is mounted on the lower light guide 902 so as to cover the lower light guide 902, and is fixed thereto.

Finally, the thus-completed light guide 900 is fixed to the lower casing 4 by screws and the like.

The lower light guide 902 on which the liquid crystal panels 925R, 925G, and 925B, the crossed-dichroic prism 910, and the projection lens 6 have been mounted may be fixed to the lower casing 4 in advance, then the upper light guide 901 having optical components mounted thereon may be reversed and mounted to the lower light guide 902 so as to cover the lower light guide 902, and thereafter the upper light guide 901 may be fixed to the lower casing 4.

Furthermore, only the lower light guide 902 may be fixed to the lower casing by screws in advance, and the liquid crystal panels 925R, 925G, and 925B, and the cross-dichroic prism 910 may be mounted thereon, and the projection lens 6 may be fixed thereto, and then the upper light guide 901 having optical components mounted thereon is reversed and mounted to the lower light guide 902 so as to cover the lower light guide 902, and thereafter the upper light guide 901 may be fixed to the lower casing 4 by screws and the like.

In addition, while the fixing of the cross-dichroic prism 910 and the projection lens 6 to the lower light guide 902, and the fixing of the upper and lower light guides 901 and 902 to the lower casing 4 are performed by means of screws in this embodiment, such fixing may be performed by other appropriate fixing method, such as bonding or fitting.

(5) Function of Optical System

In the optical unit 10 shown in FIG. 9, a substantially parallel light beam emitted from the light source device 183 is divided into a plurality of partial light beams by the first and second lens array 921 and 922 constituting the integrator optical system (illumination optical system 923). The partial light beams emitted from the small lenses 9211 of the first lens array 921 are approximately superimposed on the image formation areas of the liquid crystal panels 925R, 925G, and 925B by the superimposing lens 932. Consequently, the liquid crystal panels 925R, 925G, and 925B are illuminated by illuminating light having nearly uniform in-plane distribution.

In this case, a red light component of the light beam emitted from the illumination optical system 923 is reflected by the first dichroic mirror 941 of the color light separation optical system 924, and a blue light component and a green light component are transmitted by the first dichroic mirror 941. The red light reflected by the first dichroic mirror 941 is reflected by the reflecting mirror 943, and passes through a field lens 951 to reach the liquid crystal panel 925R for the red color. The field lens 951 converts the partial light beams emitted from the second lens array 922 into light beams parallel to the center axes (main light beams). This also applies to field lenses 952 and 953 provided in front of the other liquid crystal panels 925G and 925B.

Of the blue light and the green light transmitted by the first dichroic mirror 941, the green light is reflected by the second dichroic mirror 942 and passes through the field lens 952 to reach the liquid crystal panel 925G for the green color. On the other hand, the blue light is transmitted by the second dichroic mirror 942 to pass through the relay optical system 927, and passes through the field lens 953 to reach the liquid crystal panel 925B for the blue color. Since the optical path of the blue light is longer than the optical paths of other color lights, the relay optical system 927 is used for the blue light in order to prevent a decrease in light utilization efficiency due to diffusion of light. That is, it is used in order to transmit the partial light beams incident on the incident-side lens 954 to field lens 953 unchanged.

The red, green, and blue lights are converted only to specific polarized light beams by the incident-side polarizers 960R, 960G, and 960B when entering the liquid crystal panels 925R, 925G, and 925B. Thereafter, the polarized light beams are modulated by the liquid crystal panels 925R, 925G, and 925B according to given image information, and are emitted as modulated light to the emitting side polarizers 961R, 961G, and 961B. Only specific polarized light beams in the modulated light are transmitted by the emitting side polarizers 961R, 961G, and 961B, and are emitted to the cross-cross dichroic prism 910. The emitted polarized light beams of color lights are synthesized by the cross-dichroic prism 910 to be converted to synthesized light, and are emitted toward the projection lens 6. The synthesized light is projected as a color image onto a projection plate, such as a projection screen, by the projection lens 6.

(6) Light Source Lamp Unit

Figure 10:
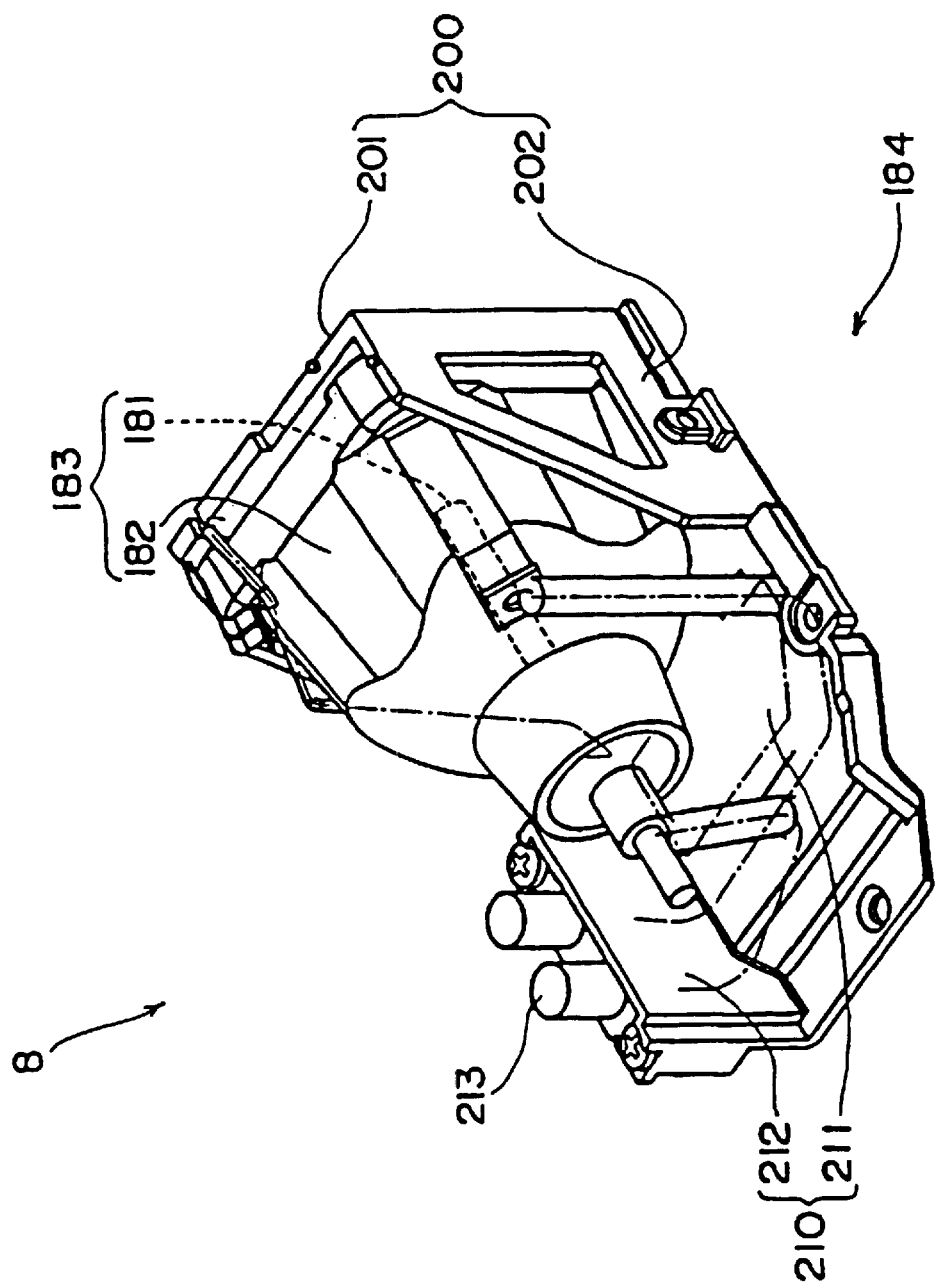
FIG. 10 is a perspective view showing a lamp housing of the projector of FIG. 1.
Figure 11:
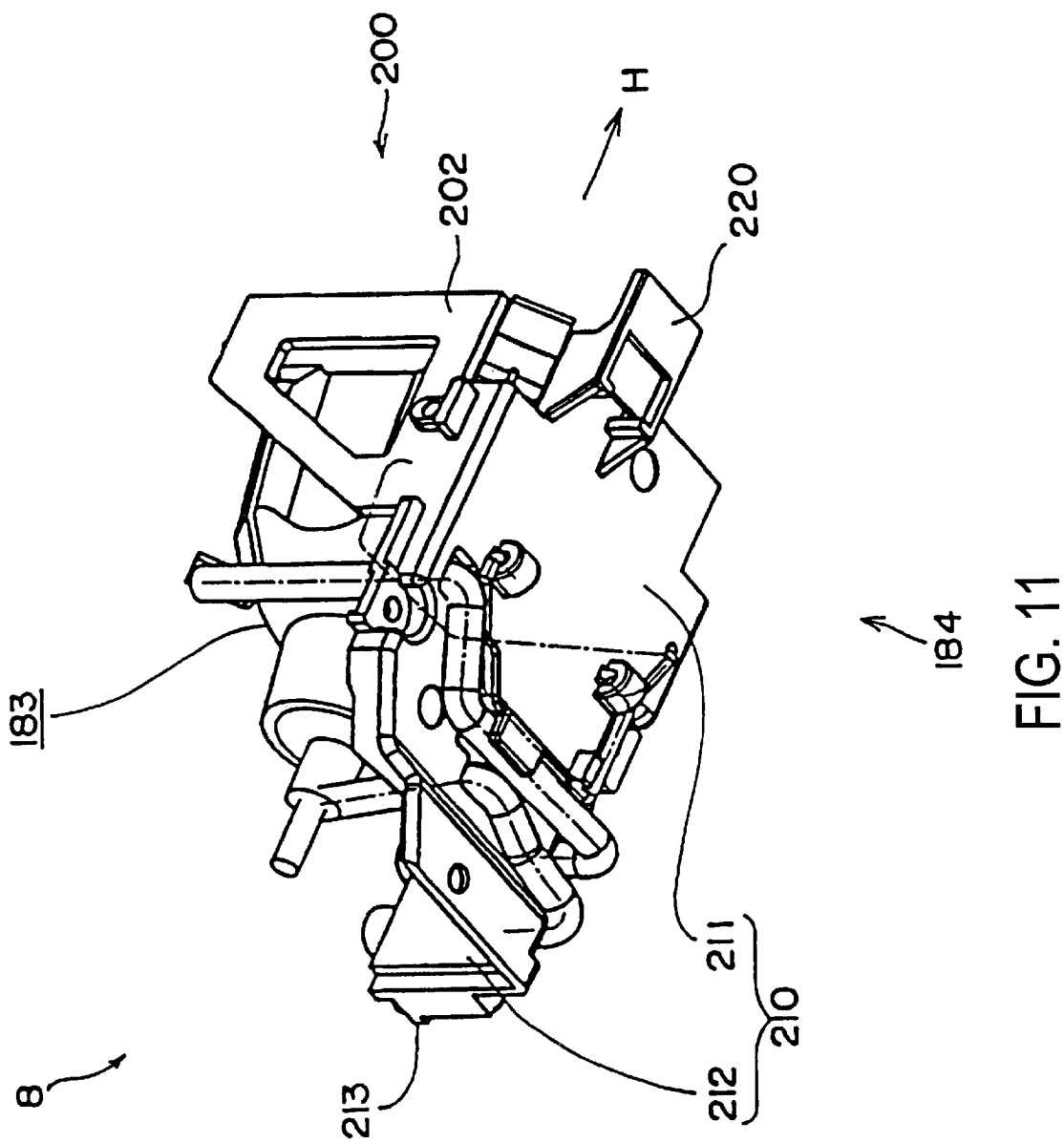
FIG. 11 is a perspective view of the lamp housing of FIG. 10 as viewed from the bottom.
Figure 12:
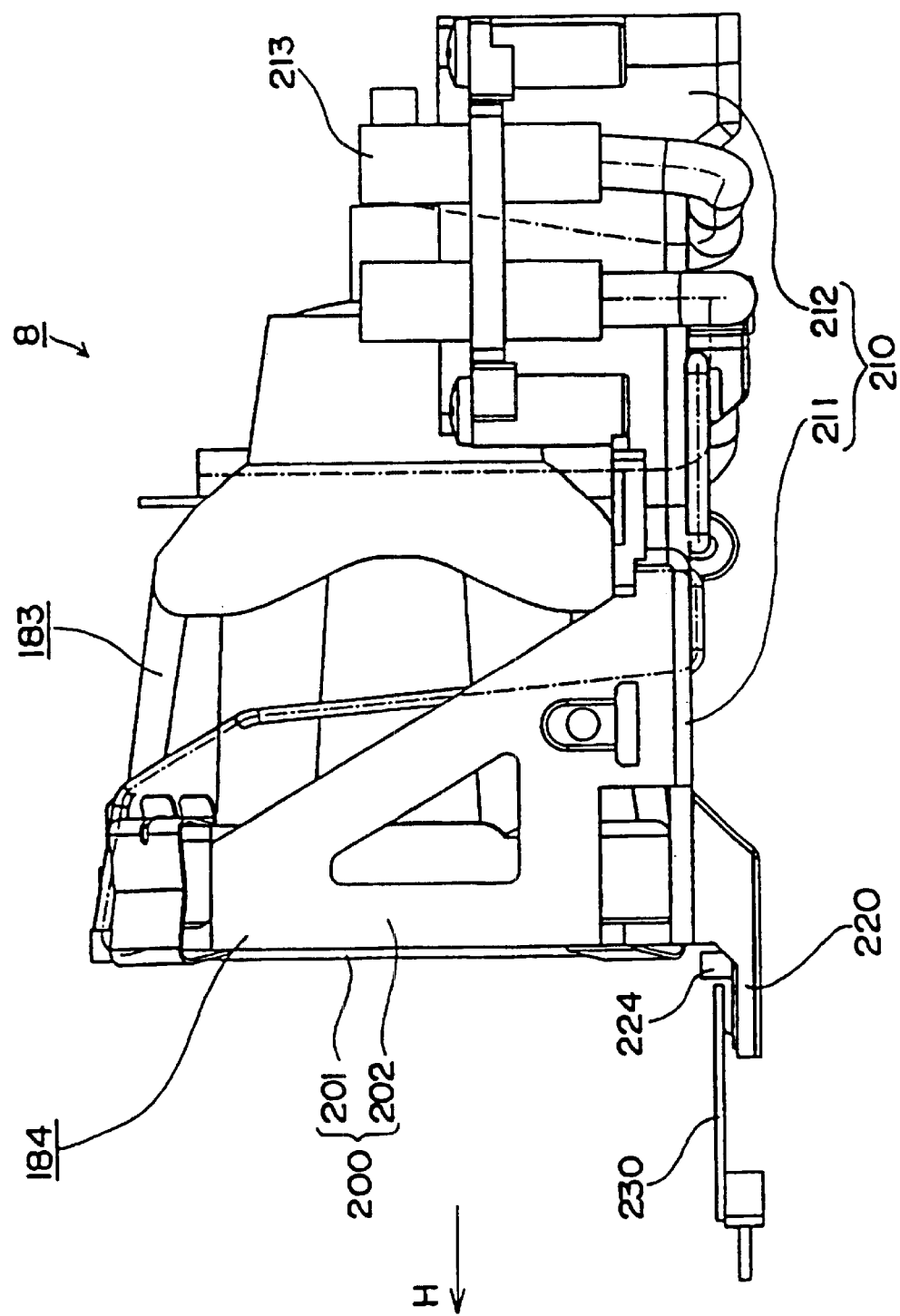
FIG. 12 is a side view of the lamp housing of FIG. 10 as viewed from a side thereof.

FIGS. 10 to 12 show the light source lamp unit 8 serving as the light source device.

FIG. 10 is a perspective view of the light source lamp unit 8 as viewed from above, FIG. 11 is a perspective view as viewed from below, and FIG. 12 is a side view thereof As described above, the light source lamp unit 8 constitutes the light source section of the projector 1, and includes the light source device 183 consisting of the light source lamp 181 and the concave mirror 182 serving as a reflector, and the lamp housing 184 for fixing and housing the light source device 183.

The lamp housing 184 is composed of a side housing 200 for covering a part of the side face of the concave mirror 182, and a bottom housing 210 to which the side housing 200 is attached and on which the concave mirror 182 is mounted.

The side housing 200 is composed of an opening frame 201 for defining a light emitting surface, and a side plate 202 for covering a part of the side face of the concave mirror 182, and is integrally formed in a U-shape in cross section.

The bottom housing 210 is composed of a mounting plate 211 on which the concave mirror 182 is mounted, and a raised plate 212 provided at the side edge of the mounting plate 211. On the outside surface of the raised plate 212, there is provided a connector 213 which makes electrical connection with the power source unit 9, and which is connected to a cable (not shown) for supplying electric power to the light source lamp 181.

Furthermore, as shown in FIGS. 11 and 12, the lamp information carrier circuit board 220 is provided on the back of the mounting plate 211 to extend in the light emitting direction H.

(7) Lamp Information Carrier Circuit Board and Lamp Information Detection Circuit Board As shown in FIG. 12, the lamp information detection circuit board 230 (hereinafter, abbreviated to as the "detection board 230") is disposed above the lamp information carrier circuit board 220 (hereinafter, abbreviated to as the "carrier board 220"). That is, the carrier board 220 and the detection board 230 are vertically stacked.

Figure 13:
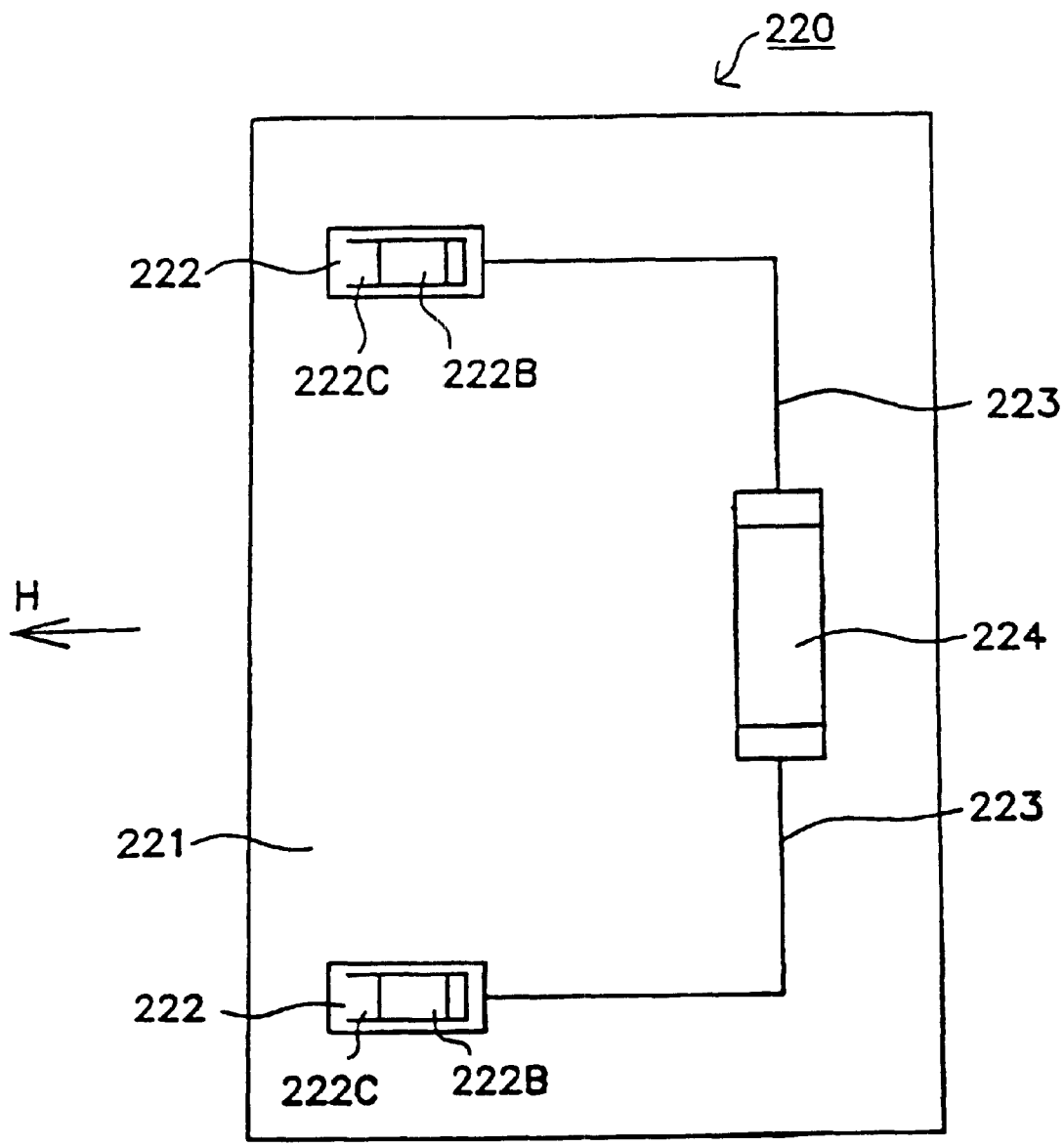
FIG. 13 is a planar schematic diagram showing a lamp information carrier circuit board of the projector of FIG. 1.

As shown in FIG. 13, the carrier board 220 is composed of, a board body 221, plate springs 222 serving as an urging device provided on both ends of the light emitting side H, wiring 223 extended from the plate springs 222, and a fuse 224 serving as a lamp information carrier element provided between the wiring 223 for determining use and nonuse of the light source lamp 181.

Figure 14:
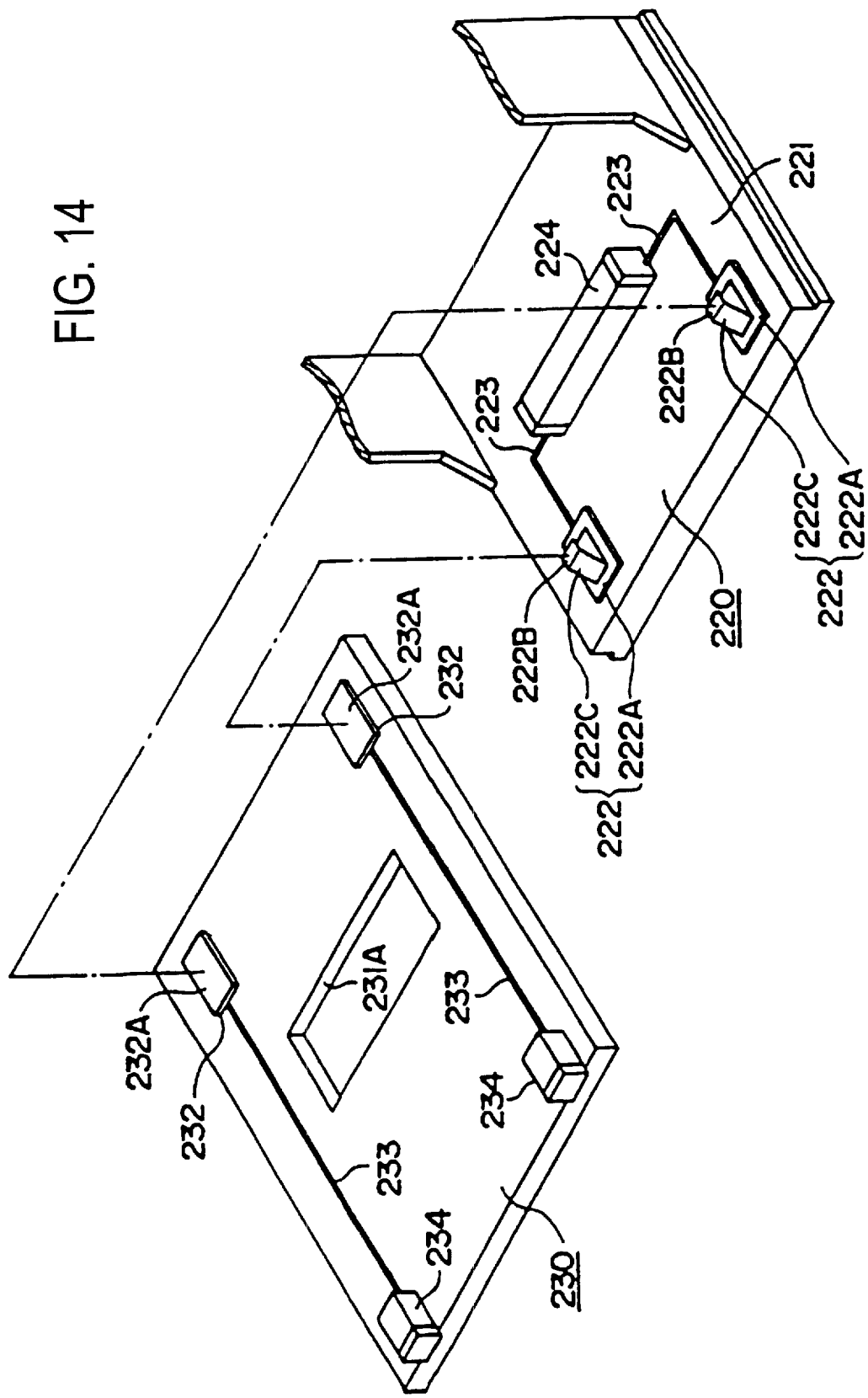
FIG. 14 is a perspective view showing the contact state of the lamp information carrier circuit board of FIG. 13 and a lamp information detection circuit board.

As shown also in FIG. 14, each plate spring 222 includes, a fixed part 222A formed in the shape of a rectangular frame and fixed to the board body 221, and a contacting part 222C having a contact surface 222B contacting the detection board 230. The contacting part 222C is formed by being bent from the fixed part 222A toward the detection board 230, whereby the contact surface 222B is urged and brought into contact with the detection board 230. The contact parting 222C is gold-plated.

The fuse 224 carries information as to whether or not the light source lamp 181 is new, and as shown in FIGS. 12 and 14, a fuse shaped like a rectangular parallelepiped is used, and is disposed at a position on the carrier board 220 apart from the detection board 230. That is, the detection board 230 is stacked on the carrier board 220 so as not to overlap the fuse 224.

Figure 15:
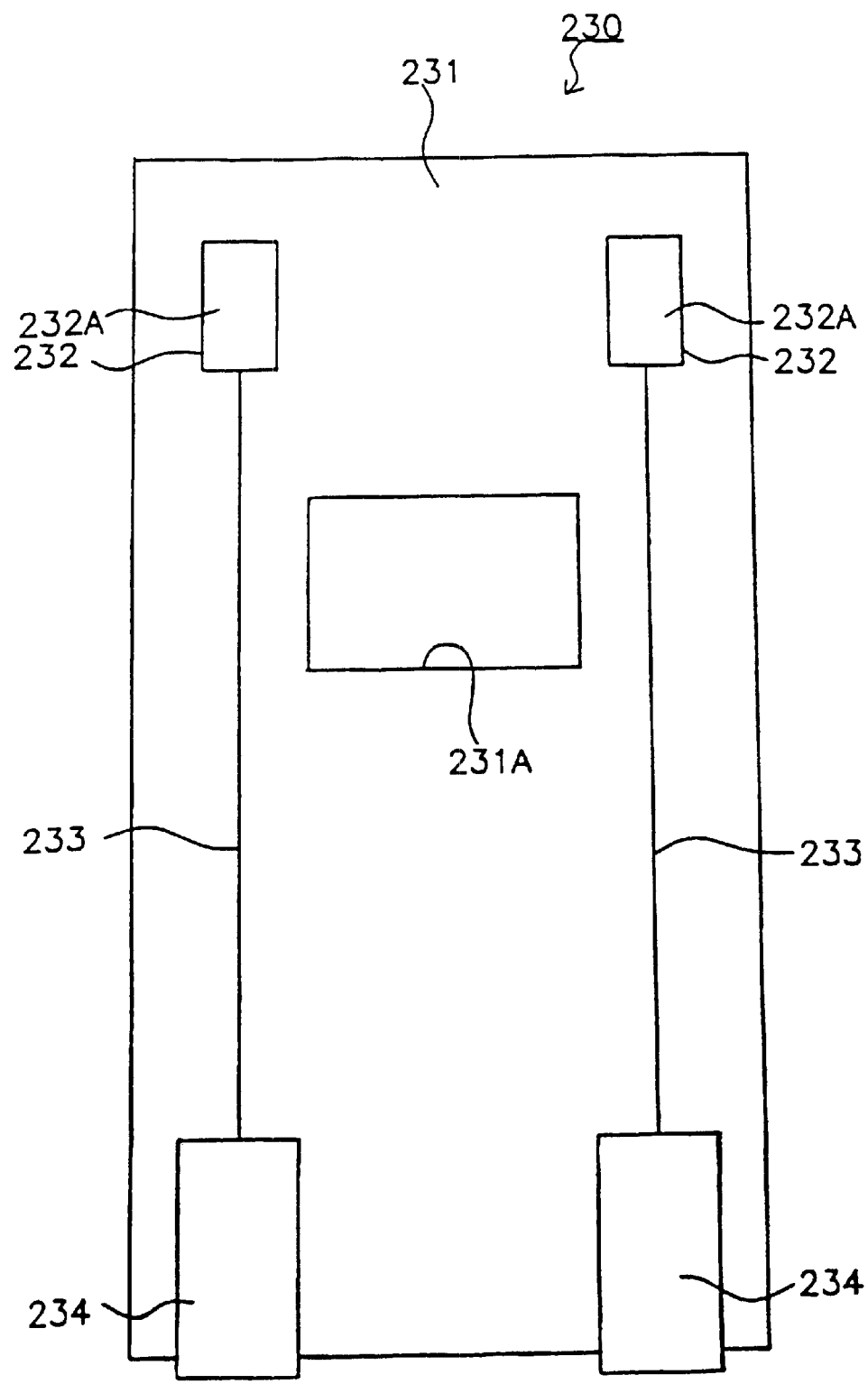
FIG. 15 is a planar schematic diagram showing the information detection circuit board of FIG. 14.

As shown in FIG. 15, the detection board 230 is composed of, a board body 231, contacted parts 232 including contacted surface 232A with which the contact surface 222B comes into contact, a wiring 233 extended from the contacted parts 232, and connectors 234 to which other ends of the wiring 233 are connected. Cables (not shown) extend from the connectors 234 to be connected to the main board (see FIG. 3). Furthermore, the board body 231 is formed with a cooling air inlet 231A for passing therethrough the cooling air introduced from the outside of the device through the intake hole 4A of the lower casing 4.

Figure 16A:
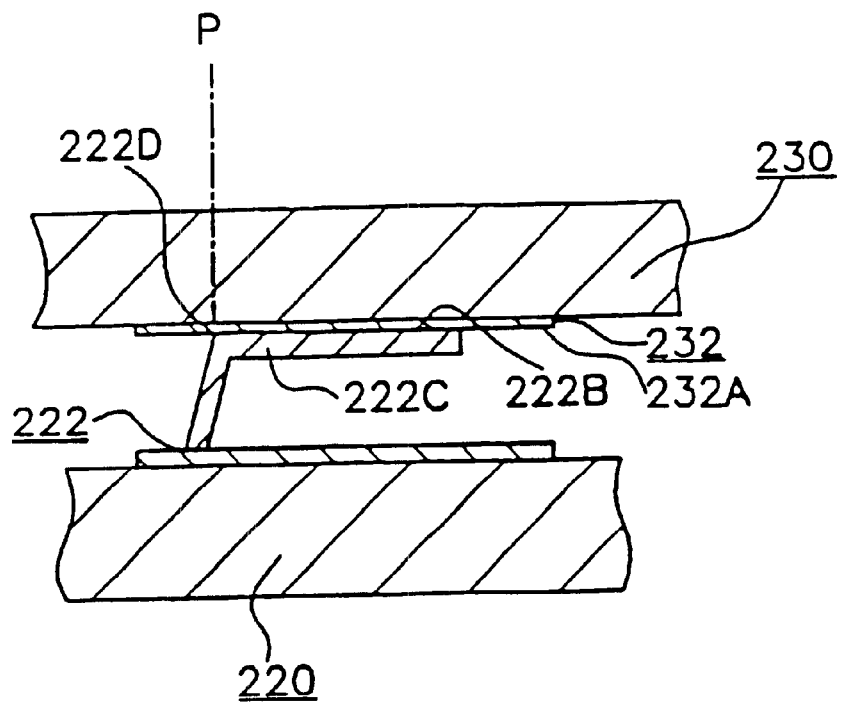
FIGS. 16(A)–(B) are sectional views showing the contact state of the lamp information carrier circuit board and the lamp information detection circuit board of FIG. 14.
Figure 16B:
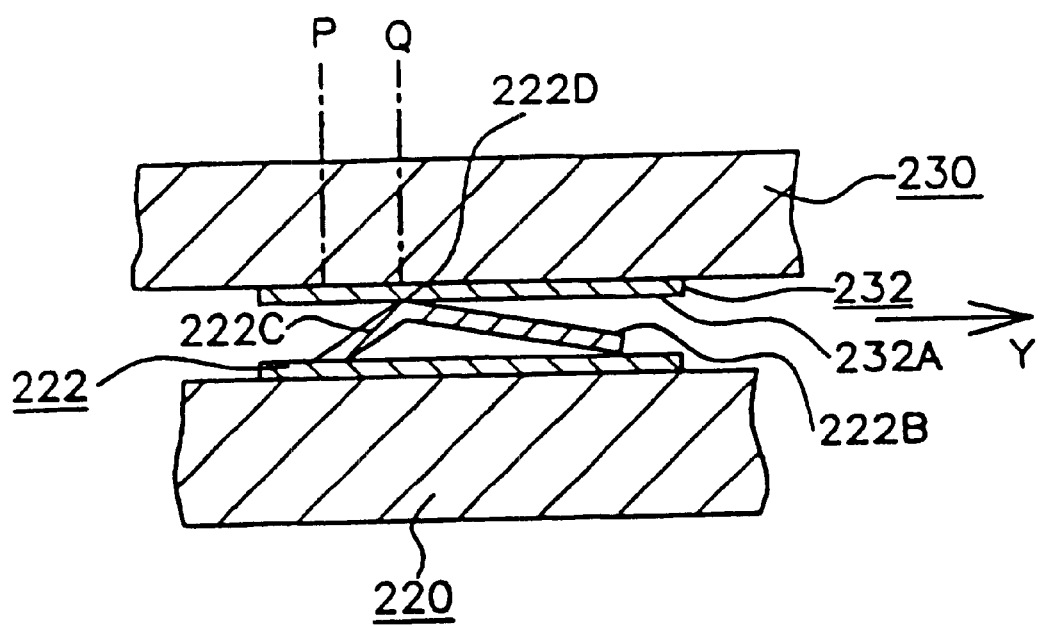

In the projector 1 having such a configuration, if the light source lamp unit 8 is mounted in the projector 1 in order to replace the light source lamp 181, the contact surface 222B and the contacted surface 232A contact each other, as shown in FIGS. 14 and 16(A). Furthermore, if the light source lamp unit 8 is completely mounted in the device 1, the contact surface 222B is pressed by the contacted part 232 to be displaced toward the fuse side Y. In this case, a bent part 222D that is a part of the contact surface 222B moves from a predetermined position P to a predetermined position Q while contacting the contacted surface 232A during the time it is pressed by the contacted part 232. That is, during the time the light source lamp unit 8 is mounted in the device 1, a state is maintained in which the bent part 222D is always in contact with the contacted part 232.

The carrier board 220 and the detection board 230 determine whether or not the light source lamp unit 8 is new according to the following procedure.

(1) When a new light source 8 is mounted, and a power switch of the projector 1 is turned on, electric signals are transmitted, on the basis of control signals from the main board 12, from the light source block 9C to the fuse 224 on the carrier board 220 via the detection board 230. Electrical continuity of the fuse 224 is thus confirmed.

(2) Then, when a CPU provided on the main board 12 confirms the electrical continuity, total operating time of the light source lamp 181 recorded in the memory of the main board 12 is reset.

(3) In succession, the main board 12 outputs control signals, and outputs a large electric current (excess current) from the power source block 9C to the carrier board 220 via the detection board 230 so as to break the fuse 224.

(4) Even if a light source lamp unit 8 which was previously used is mounted in the device 1 again, since the fuse 224 is broken, electrical continuity on the carrier board 220 is not confirmed, and the total operating time of the light source lamp 181 is totaled up.

When the total operating time exceeds the service life value according to the performance of the light source lamp 181, a light-switching-off operation such that the light source lamp 181 is switched off by the main board 12, and a fan (not shown) in the device 1 is rotated for cooling down is forcibly performed. In this case, an image showing lighting time or number of replacement of the light source lamp 181 and a frequency or polarity of a projected image is projected.

(8) Advantages of Embodiment

According to the above embodiment, the following advantages can be obtained.

The carrier board 220 and the detection board 230 are stacked so that the fuse 224 provided on the carrier board 220 does not overlap the detection board 230. For this reason, since the carrier board 220 and the detection board 230 are stacked close to each other, the total thickness of the carrier board 220 and the detection board 230 can be reduced as compared to a conventional projector in which they are stacked via the fuse. Therefore, a reduction in size of the projector 1 can be achieved.

In addition, the carrier board 220 and the detection board 230 are electrically connected via the plate springs 222 provided on the carrier board 220. For this reason, the urging force of the plate springs 222 enables the plate springs 222 to contact the contacted part 232 of the detection board 230. Accordingly, by only mounting (accommodating) the light source lamp unit 8 in the projector 1, electrical continuity can be automatically established.

Furthermore, since the plate springs 222 are provided on the side of the light source lamp unit 8, the plate springs 222 are also replaced each time the light source lamp unit 8 is replaced. Accordingly, contact failure caused by a decrease in urging force can be prevented, and excellent electrical connection between the boards 220 and 230 can be maintained.

Each of the plate springs 222 includes the contacting part 222C urged toward the detection board 230. For this reason, the structure can be simplified compared to a case in which it is formed by a coiled spring or the like, thereby facilitating manufacture of the plate spring 222.

In addition, when mounting (accommodating) the light source lamp unit 8 in the projector 1, the bent part 222D of each plate spring 222 moves from the predetermined position P to the predetermined position Q while contacting the contacted part 232 by the urging force. Accordingly, it is possible to remove dust and the like adhered to the contacted part 232, whereby contact failure between the plate springs 222 and the detection board 230 can be prevented beforehand.

Furthermore, the contacting part 222C is gold-plated. Accordingly, the contacting part 222C is not oxidized to rust, and electrical continuity can be positively secured even if it is used for a long period of time.

Since the detection board 230 is provided with the cooling air inlet 23 1A, heat of the wiring 233 or the connector 234 generated by the passage of current can be rapidly cooled.

(9) Modifications of Embodiment

The present invention is not limited to the above embodiment, and includes other configurations that can achieve the object of the present invention, and the following modifications are included in the present invention.

For example, while the contacting part 222C of the plate spring 222 is gold-plated in the embodiment, metals, such as platinum and silver, or alloys such as stainless steel may be used.

In addition, while the plate spring 222 consisting of the fixed part 222A and the contacting part 222C is used as an urging device in the embodiment, the urging device is not limited thereto.

Figure 17A:
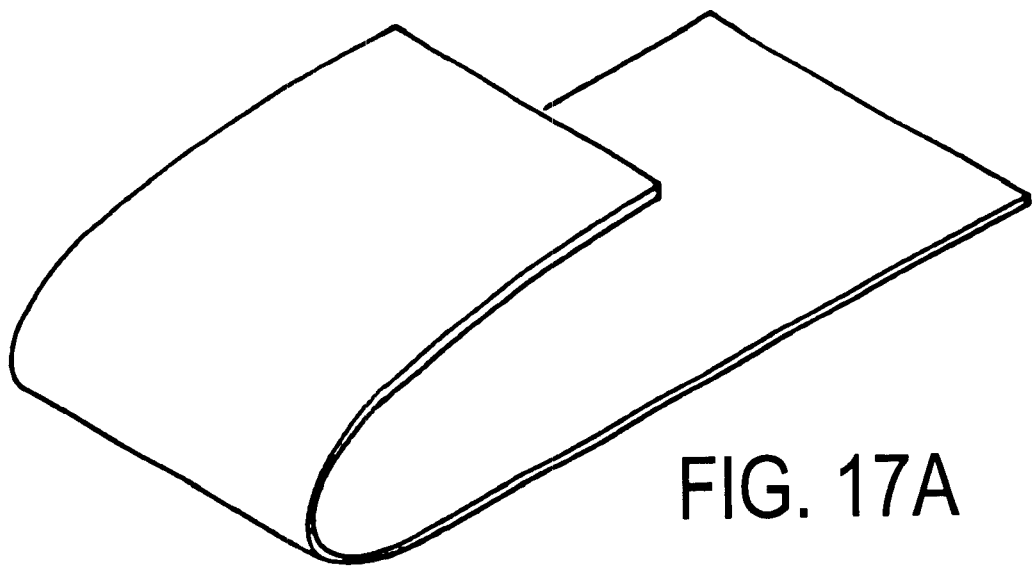
FIGS. 17(A) and 17(B) are perspective views, each showing modifications of the exemplary embodiment.
Figure 17B:
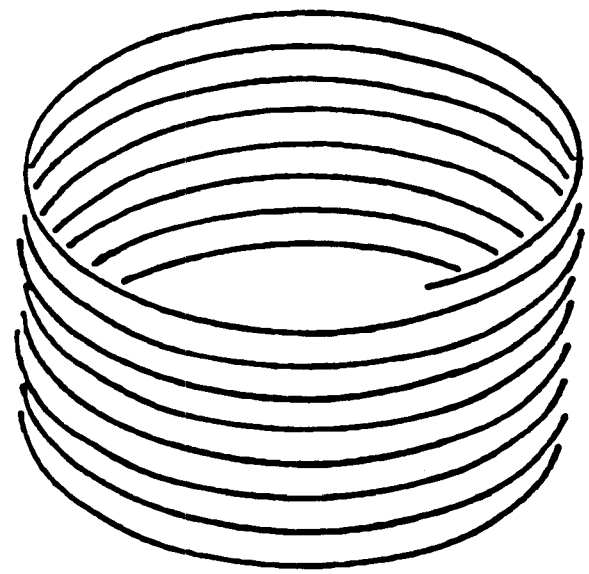

For example, a plate spring obtained by curving and bending a metallic plate member as shown in FIG. 17(A) may be used. In this case, the plate spring can be easily processed. Furthermore, a coiled spring as shown in FIG. 17(B) may be used. In this case, a coil spring available in market may be applied, and the plate spring can be formed at low cost.

Furthermore, while the plate springs 222 are provided on the side of the carrier board 220 in the embodiment, they may be provided on the side of the detection board 230. This simplifies the structure of the carrier board 220, whereby it is possible to reduce the cost of manufacturing the light source lamp unit 8.

In addition, while the fuse 224 shaped like a rectangular parallelepiped is used as the lamp information carrier element in the embodiment, a plug fuse or a cylindrical fuse may be used. Furthermore, aluminum foil that is cut by a cutting device when inserting the light source lamp unit 8 may be provided between the wiring 223. In this case, since the configuration of means for determining the usage can be simplified, the carrier board 220 can be easily manufactured. In short, an article may be used as long as it cuts off electrical continuity, which was previously established, after the total operating time is reset by the main board 12 during the replacement of the light source lamp unit 8.

Still furthermore, the information carried by the lamp information carrier element is not limited to information as to whether or not the lamp is a new article, and may be information about operating time, or the type of the lamp. In addition, it is possible to configure the lamp information carrier element for carrying such information by a storage element, such as a semiconductor element in addition to the use of the fuse 224 as in the embodiment.

Furthermore, while the electro-optical device 925 is composed of the three liquid crystal panels 925R, 925G, and 925B in the embodiment, the present invention may be adopted to an optical modulation device composed of one or two liquid crystal panels.

While the panels consisting of the electro-optical device 925 are formed of liquid crystal elements in the embodiment, the present invention may be adopted to a projector equipped with an optical modulation device formed of device panels using a plasma element or a micro-mirror other than liquid crystal.

In addition, while the electro-optical device 925 in the embodiment is of a type which transmits and modulates light beams R, G and B, the present invention may be adopted to a projector including a reflective optical modulation device which modulates and emits incident light while reflecting.

According to the projector of the present invention, since the lamp information detection circuit board is stacked so as not to overlap the lamp information carrier element of the lamp information carrier circuit board, as compared to a conventional projector in which these boards are stacked in a state of sandwiching the lamp information carrier element, the space between the lamp information carrier circuit board and the lamp information detection circuit board can be narrowed, and the total thickness represented by the sum of the thickness of the lamp information carrier circuit board, the projecting size of the fuse provided on the lamp information carrier circuit board, and the thickness of the lamp information detection circuit board, can be reduced. Accordingly, a reduction in size of the projector can be achieved.

What is claimed is:

1. A projector, comprising:

a light source device having a lamp information carrier circuit board including a lamp information carrier element that determines use and nonuse of a light source;

a lamp information detection circuit board that detects information from the lamp information carrier circuit board, the lamp information carrier circuit board and the lamp information detection circuit board being stacked so that the lamp information detection circuit board does not overlap the lamp information carrier element of the lamp information carrier circuit board; and an urging device, the lamp information carrier circuit board and the lamp information detection circuit board being electrically connected via the urging device, the urging device comprising:

a fixed part fixed to one of the lamp information carrier circuit board and the lamp information detection circuit board; and a contacting part having a contacting surface urged toward one of the lamp information carrier circuit board and the lamp information detection circuit board which is not provided with the fixed part and contacting one of the lamp information carrier circuit board and the lamp information detection circuit board which is not provided with the fixed part, and the contacting part being composed of a plate spring.

2. The projector as claimed in claim 1, the urging device being provided on the lamp information carrier circuit board.

3. The projector as claimed in claim 2, the urging device including a contacting part that is gold-plated.

* * * * *